(12) United States Patent
Geisner et al.

(10) Patent No.: US 8,425,187 B2
(45) Date of Patent: Apr. 23, 2013

(54) PRESSURE VESSEL HAVING A LID

(75) Inventors: Jürgen Geisner, Duisburg (DE); Dieter Naβ, Moers (DE)

(73) Assignee: Siemens Aktiengesellschaft, München (DE)

( * ) Notice: Subject to any disclaimer, the term of this patent is extended or adjusted under 35 U.S.C. 154(b) by 496 days.

(21) Appl. No.: 12/738,365

(22) PCT Filed: Sep. 11, 2008

(86) PCT No.: PCT/EP2008/062025
§ 371 (c)(1),
(2), (4) Date: Jun. 17, 2010

(87) PCT Pub. No.: WO2009/053155
PCT Pub. Date: Apr. 30, 2009

(65) Prior Publication Data
US 2010/0296922 A1    Nov. 25, 2010

(30) Foreign Application Priority Data
Oct. 19, 2007  (EP) .................................... 07020503

(51) Int. Cl.
*F04D 29/44* (2006.01)
(52) U.S. Cl.
USPC ...................... 415/204; 415/213.1; 415/214.1

(58) Field of Classification Search .................. 415/203, 415/204, 205, 206, 212.1, 213.1, 214.1, 215.1; 417/423.14, 423.1
See application file for complete search history.

(56) References Cited

U.S. PATENT DOCUMENTS

| 2,818,193 A | * | 12/1957 | Boni, Jr. ......................... 220/298 |
| 5,755,554 A | | 5/1998 | Ryall |

FOREIGN PATENT DOCUMENTS

| DE | 503754 C | 7/1930 |
| EP | 1010931 A1 | 6/2000 |
| EP | 1314859 A1 | 5/2003 |
| GB | 1269663 A | 4/1972 |

\* cited by examiner

*Primary Examiner* — Edward Look
*Assistant Examiner* — Juan G Flores

(57) ABSTRACT

A pressure vessel including a lid, wherein the lid is fixed to a corresponding lid receptacle, wherein the lid has a first bearing surface that extends in the circumferential direction and interacts in a sealing manner with a second bearing surface on the pressure vessel, wherein fixing elements are provided for fixing the lid to the pressure vessel. The fixing elements are wedge-shaped, rest on an abutment surface of the pressure vessel and on a contact surface of the lid such that, when the fixing element is moved in a direction that causes a wider section of the wedge shape to be located between the abutment surface and the contact surface, the bearing surfaces are brought closer together or braced against each other.

16 Claims, 3 Drawing Sheets

PRESSURE VESSEL HAVING A LID

CROSS REFERENCE TO RELATED APPLICATIONS

This application is the US National Stage of International Application No. PCT/EP2008/062025, filed Sep. 11, 2008 and claims the benefit thereof. The International Application claims the benefits of European Patent Office application No. 07020503.4 EP filed Oct. 19, 2007. All of the applications are incorporated by reference herein in their entirety.

FIELD OF INVENTION

The invention refers to a pressure vessel with a cover, especially to a pressure vessel of a turbomachine, especially a turbocompressor casing with a cover which is formed as an inlet scroll, which cover is fastened on a corresponding cover seat, wherein the cover has a first locating face which extends in the circumferential direction and interacts with a second locating face on the pressure vessel, and wherein provision is made for fastening elements for fastening the cover on the pressure vessel.

BACKGROUND OF INVENTION

The closing off of pressure vessels by means of sealing elements, for example by means of covers which enable accessibility to the inside of the pressure vessel without damage to this, is a much dealt-with technical problem which with increasing size of pressure vessels with increasing pressures is constantly repeated. The problem is additionally intensified if the pressure vessel serves not only for the simple storage of a pressurized medium but also has to meet additional requirements. In the case of a turbomachine, for example a turbocompressor, the additional task is set of not allowing the fastening elements for closing off the pressure vessel to collide with other constructional elements. If the cover itself is to furthermore serve not only for closing off the pressure vessel but if necessary also to serve as a carrier of functional components, for example as a carrier of a bearing for the rotor of a turbomachine, which rotor is guided through the cover, wherein by means of a shaft seal the gap between the cover and the rotor is sealed off, special demands are to be made on the rigidity of the cover itself and its fastening so that no undesirable displacements of the functional components take place. A further requirement in the case of particularly large pressure vessels of the previously described type is that in view of the very large weight of a cover for a pressure vessel, installation has to be carried out under limiting conditions which are to be found on a construction site. If in this case the cover at the same time is a carrier of additional functional modules, which in their turn can also have a heavy weight, the requirement for displacements of the cover within the scope of the installation procedure has to be limited to a minimum in order to be able to carry out damage-free installation under realistic conditions.

SUMMARY OF INVENTION

Starting from the previously described problems, the invention is based on the object of creating a pressure vessel of the type referred to in the introduction, in which despite large dimensions and high internal pressure a pressure tightness can be reliably ensured and despite a potentially heavy net weight the cover can be fastened in a space-saving manner on the pressure vessel with a high degree of accuracy.

For achieving the object according to the invention, it is proposed that the fastening elements on a pressure vessel of the aforementioned type are of a wedge-like construction, and on one side abut against an abutment surface of the pressure vessel and on the other side abut against a contact surface of the cover in such a way that a displacement of the fastening element in a direction which causes a wider section of the wedge shape to be located between the abutment surface and the contact surface brings the locating faces closer together or clamps them against each other.

Conventional pressure vessels regularly make provision for a flange-like screwed connection of the cover to a cover seat for the cover, wherein with increasing internal pressure and size of the cover these flange screws are to be used in large numbers with close spacing in the circumferential direction and with large diameter. The flange of the cover seat or of the cover, which is furthermore weakened by the flange holes, must also have an enormous wall thickness in order to withstand the loads. Also, the installation of such constructions is costly since the flange screws regularly have to be brought into the desired pretensioned state by means of special pieces of equipment. The wedge-shaped fastening element according to the invention on the other hand enables a space-saving fastening of the cover on the pressure vessel with only little cost.

It is especially expedient in this case if the cover is arranged comparatively in the inside of the pressure vessel so that the first locating face of the cover, lying opposite the second locating face of the pressure vessel, points outwards, and by the surface load upon the cover the two locating faces are clamped against each other in the case of an internal overpressure. In this way, the wedge-shaped fastening element is to be dimensioned only for the task of keeping the cover in the correct position in relation to the pressure vessel and in particular to absorb the load which occurs transversely to the locating faces or to normally clamp the locating faces against each other even without internal pressure being applied in such a way that the static friction force which is consequently created is sufficient to prevent a relative movement between these two faces.

An advantageous development of the invention makes provision for the surface normal of the locating face to be parallel to a plane normal of a plane which is spanned by the circumference of the cover. In this way, a normal flat seal can be used to ensure reliable sealing tightness.

A radially outwardly open U-shaped profile contour of the cover, which at least in sections extends in the circumferential direction, in which in the assembled state a preformed flange of the pressure vessel, which at least in sections extends radially inwards, is located, wherein on an inner side surface of the U-shaped profile contour the first locating face is formed and, lying opposite this, the second locating face is arranged on the preformed flange, brings essential advantages. An essential advantage of this design of the cover is that the cover is pressed outwards by an overpressure inside the vessel in such a way that the locating faces are clamped to each other, forming a sealing arrangement. A further advantage is that the U-shaped profile contour enables inserting the fastening element next to the preformed flange of the pressure vessel and in this way—assuming the locating faces are located inside the pressure vessel—the fastening element with its wedge shape can be installed in the U-shape next to the preformed flange in an easily accessible manner on the outside. The combination of these two advantages, that is to say the clamping of the locating faces against each other on account of the internal pressure and the good accessibility of the fastening element as a result of the outside position, can be achieved with no other configuring of the cover or of the pressure vessel.

Both the profile contour and the preformed flange can be formed in sections over the circumference in such a way that a bayonet-like fitting of the cover in the cover seat can be carried out, that is to say first of all a translational movement is carried out and then a rotation of the cover is carried out. Such a design is especially a possibility when no additional special functional modules on the cover make this more difficult.

An especially advantageous development results, however, if both the profile contour with the first locating face and the preformed flange of the second locating face extend over the entire circumference of the cover. In this way, the connection of the cover to the pressure vessel becomes especially robust.

If the cover has the U-shaped profile contour, an especially advantageous development makes provision for the fastening element to be located in the U-shape of the profile contour and for the abutment surface of the cover to be located on the flank of the U-shape which lies opposite the second locating face, and for the contact surface of the pressure vessel to be located on the preformed flange opposite the second locating surface so that the fastening element is located between contact surface and abutment surface.

The quality of the fastening of the cover on the pressure vessel is additionally increased if the contact surface and the abutment surface together form a wedge gap with an angle which corresponds to the wedge angle of the fastening element.

The fastening element can advantageously have a screw by means of which it is forced or pressed into the wedge gap, and can be secured there. If necessary, a fastening element has a plurality of screws which preferably extend through a through-hole of the fastening element and for example are screwed into a threaded hole in the base of the U-shape of the profile contour.

The fastening element, which preferably extends in the circumferential direction, expediently has a ring segment form with a wedge-shaped cross-sectional profile, wherein the wedge shape tapers radially inwards. For a symmetrical force flux over the fastening element it is advisable if provision is made for a plurality of fastening elements over the circumference along the cover seat.

The pressure vessel expediently has a parting joint which splits the vessel installation. The splitting of the vessel installation or of the pressure vessel is preferably carried out in such a way that the vessel installation is divided into at least two approximately similar sections, preferably into half-rings. The advantage is that the cover with the outwardly pointing first locating face can be inserted in one vessel half before the second vessel half is fitted and in this way anchors the cover on the pressure vessel at least in a form-fitting manner by means of the second locating face.

For a maximum of accuracy of positioning the cover in relation to the pressure vessel, it is possible for the cover to be centered in relation to the pressure vessel by means of centering elements. This is especially expedient if the cover is a carrier of a bearing of a rotor which extends through the cover. The invention can be especially expediently applied if the cover is possibly additionally a carrier of an inlet scroll for a compressor which is located in the pressure vessel. The heavy weight of the inlet scroll can be fastened on the pressure vessel by means of the fastening according to the invention without particularly high installation cost.

BRIEF DESCRIPTION OF THE DRAWINGS

The invention is explained in the following based on a special exemplary embodiment with reference to drawings. In the drawings.

DETAILED DESCRIPTION OF INVENTION

Figure 1:
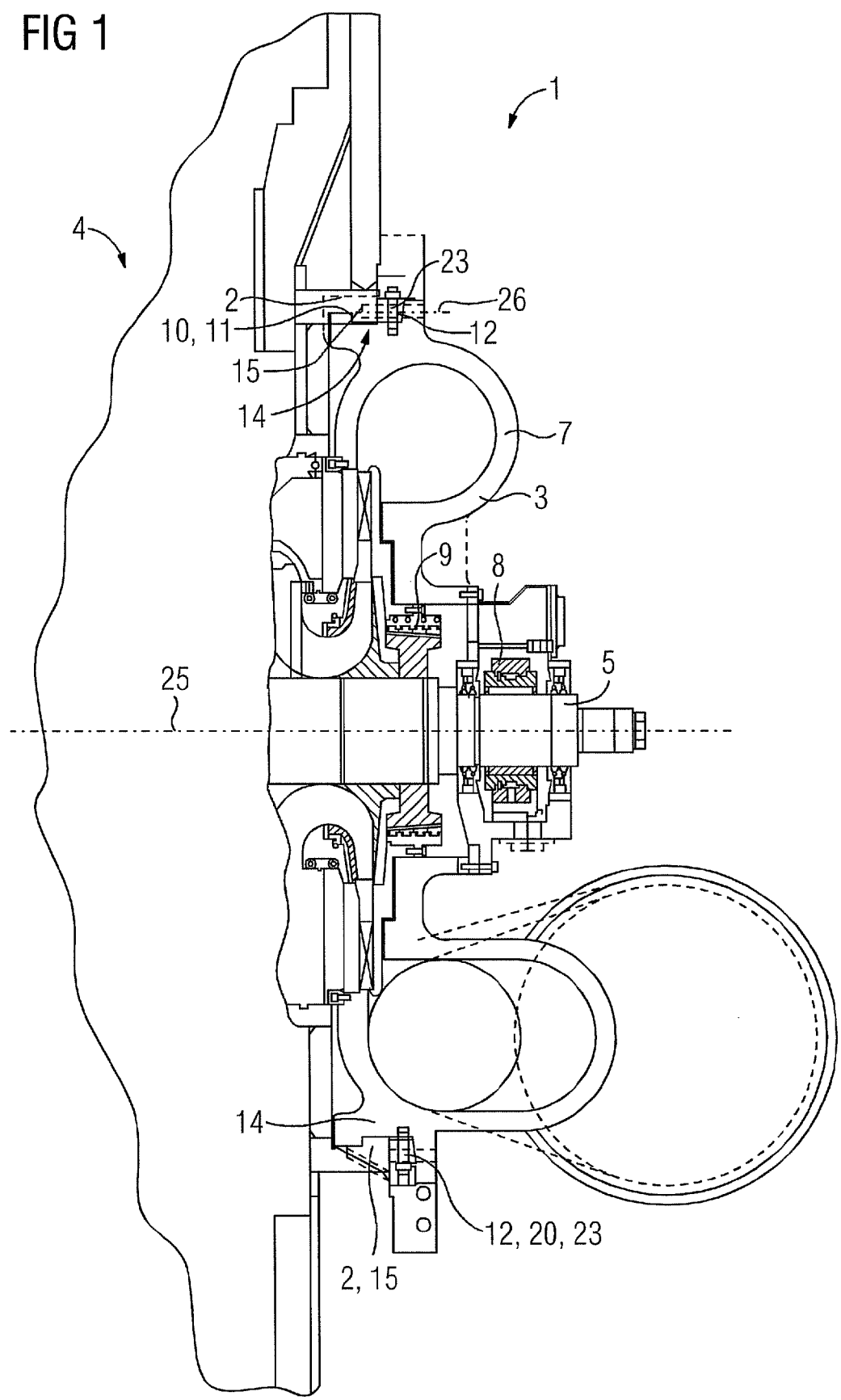
FIG. 1 shows a section through a section of a compressor with a vessel installation of a pressure vessel, wherein the cover, which is installed on the vessel installation, is a carrier of a bearing for a compressor rotor and for an inlet scroll.
Figure 2:
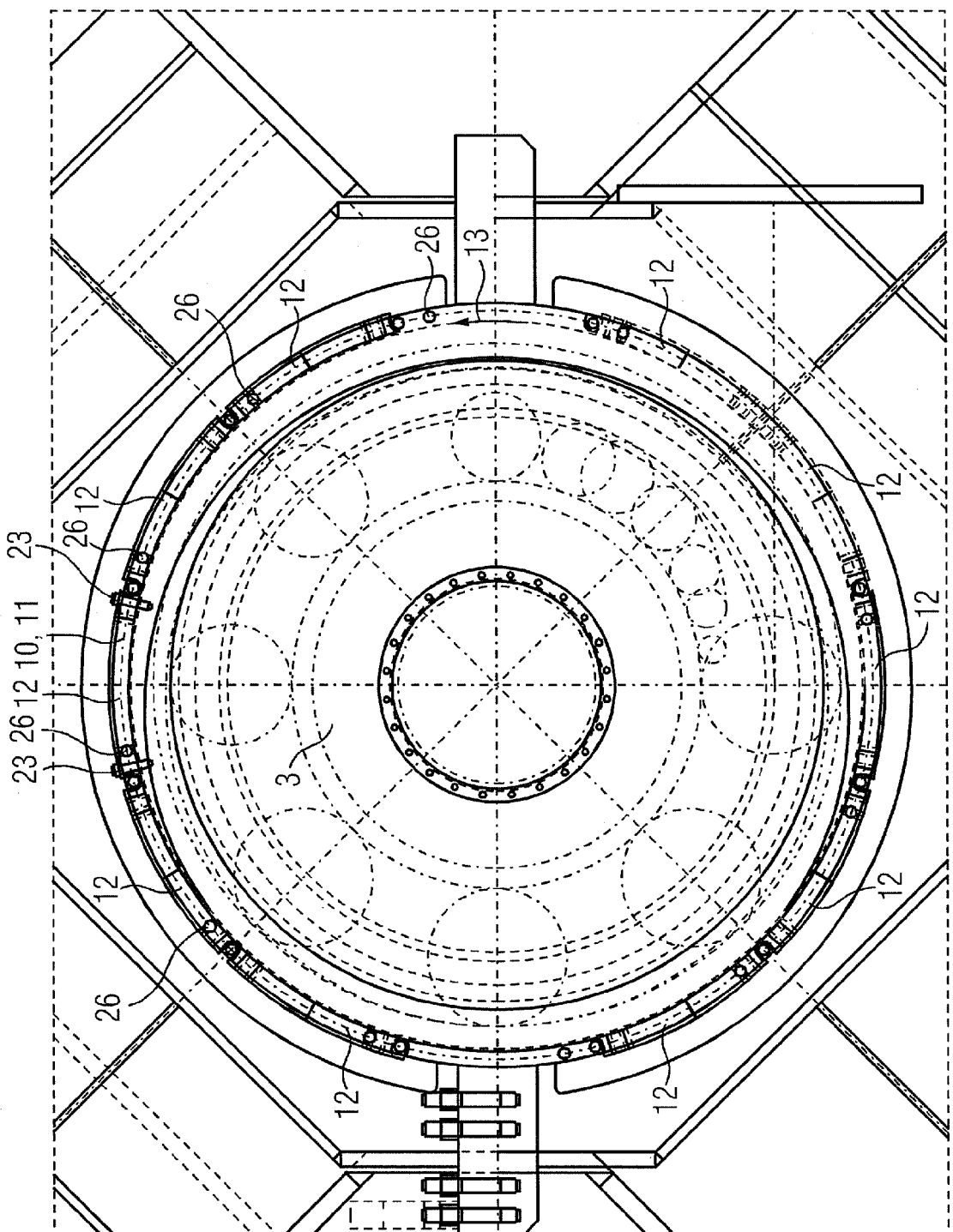
FIG. 2 shows a view in the axial direction of the axis of the rotor which is shown in FIG. 1 of details of the fastening of the cover on the pressure vessel.
Figure 3:
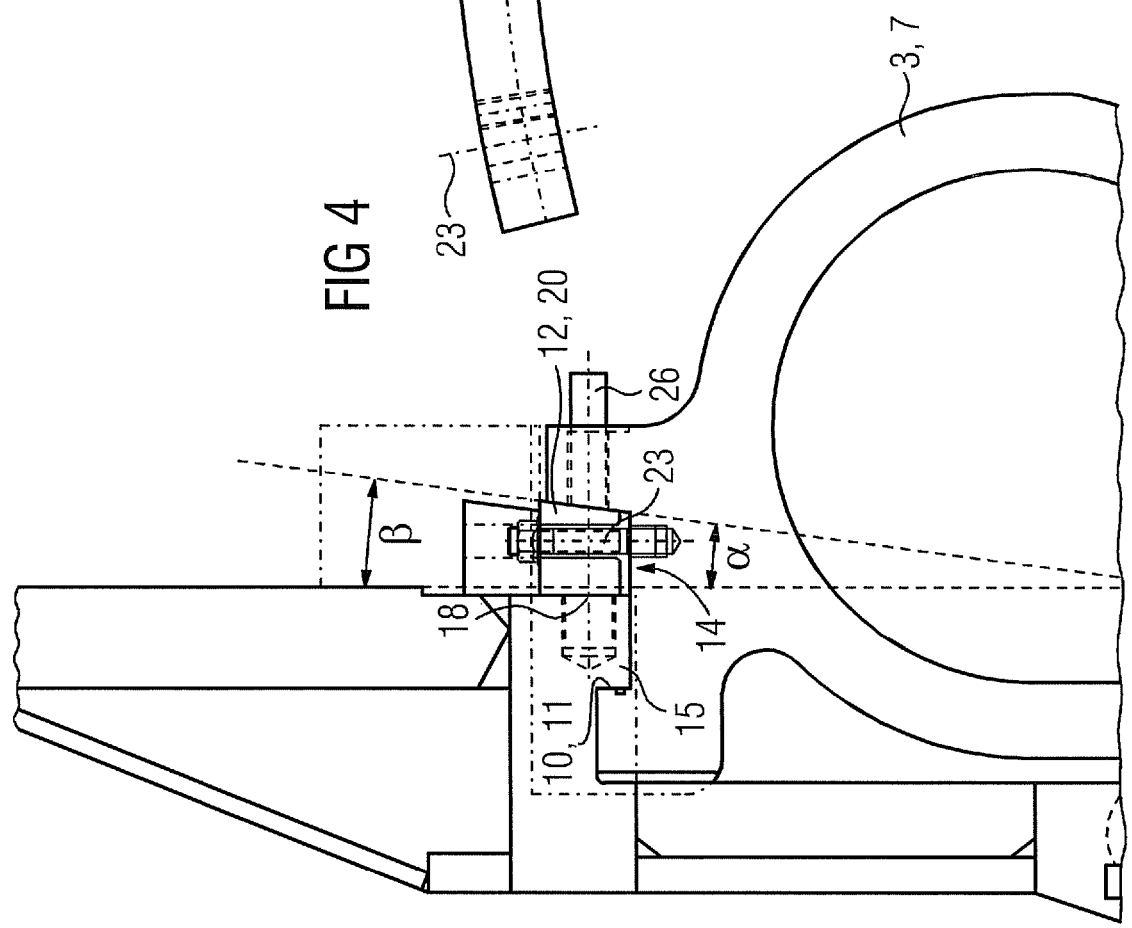
FIG. 3 shows a sectional view which shows in detail the interaction of the fastening element with the cover and with the vessel installation of the pressure vessel.
Figure 4:
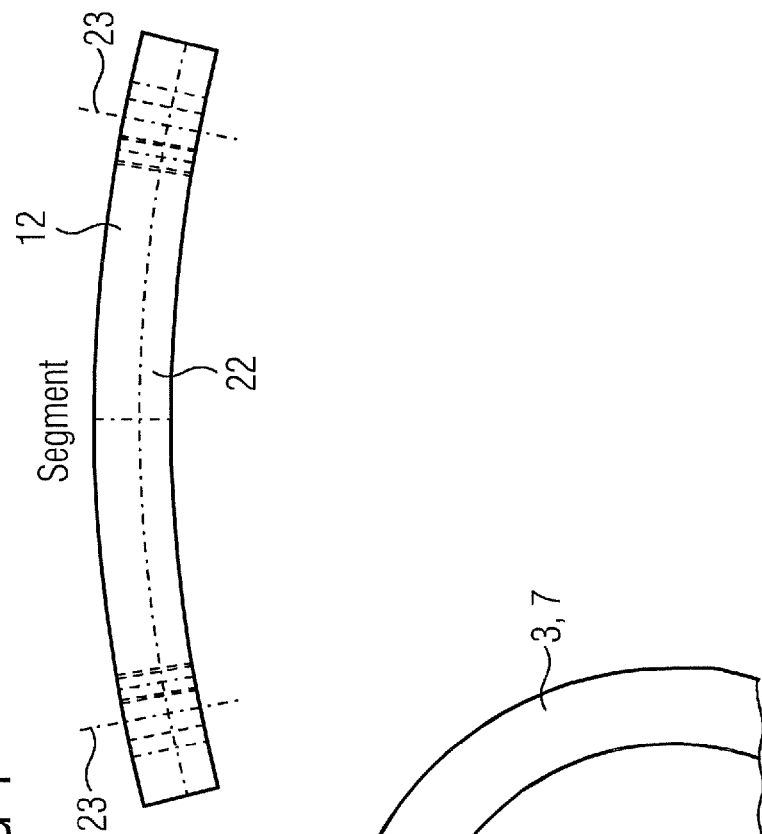
FIG. 4 shows a wedge-shaped ring segment of a fastening element.

FIG. 1 shows a pressure vessel 1 which, except for a region of a cover seat 2 for the seating of a cover 3 of the vessel, is only given to be understood. The pressure vessel 1 of FIG. 1 is a casing of a turbocompressor 4, the rotor 5 of which extends through the cover 3. This turbomachine 6 also has an inlet scroll 7 which is formed in one piece with the cover 3. In addition, the cover 3 is also a carrier of a radial bearing 8 and also of a shaft seal 9 which supports the rotor 5 or provides sealing for the rotor 5. As is also to be gathered in detail from FIG. 3, the cover 3 has a first locating face 10 which is clamped by means of a fastening element 12 to an opposite-lying second locating face 11 of the pressure vessel 1. Both the first locating face 10 and the second locating face 11 extend continuously in a circumferential direction 13. In the region of the cover seat 2, the cover 3 has a U-shaped profile contour 14, the U-shape of which is radially outwardly open and into which a preformed flange 15 of the pressure vessel 1 projects. Both the profile contour 14 and the preformed flange 15 also extend continuously in the circumferential direction. The cover 3 has the first locating face 10 on the outwardly pointing inner side face of the U-shape of the profile contour 14, and the preformed flange 15 is provided with the second locating face 11 on the opposite side which points into the inside of the pressure vessel 1. On the other side, opposite the second locating face 11, the preformed flange 15 is formed as a contact surface 18 which interacts with an abutment surface 19 on the opposite side of the inwardly pointing side face of the U-shape of the profile contour 14. The abutment surface 19 forms with the contact surface 18 a wedge gap 20 with an angle β.

The fastening element 12 is of a wedge-like construction with a wedge angle α which corresponds to the angle β of the wedge gap 20. The fastening element 12 also has the form of a ring segment 22, wherein the wedge-shaped cross-sectional profile tapers radially inwards. The fastening element 12 is inserted into the wedge gap 20 in the course of the installation and by means of two screws 23 in each case, which extend through a throughhole radially inwards through the fastening element 12 and engage in a threaded hole in the base of the profile contour 14, is fastened and secured on the cover 3. A plurality of fastening elements 12 are arranged over the circumference of the cover seat 2 so that a uniform force introduction results. The pressure vessel 1 has a horizontal parting joint 25 so that during installation the cover 3 can be inserted into the lower section of the pressure vessel 1 in such a way that the preformed flange 15 engages in the profile contour 14, and then the upper section of the pressure vessel 1 can be fitted so that an initially form-fitting anchoring of the cover 3 in the pressure vessel 1 results. Centering elements 26 ensure a correct radial alignment of the cover 3 with the pressure vessel 1 so that the radial bearing 8 in particular achieves the intended position.

The invention claimed is:

1. A pressure vessel, comprising:
   a cover, comprising:
      a first locating face which extends in a circumferential direction and interacts with sealing effect with a second locating face on the pressure vessel; and
   a plurality of fastening elements,
   wherein the cover is fastened on a corresponding cover seat,
   wherein the plurality of fastening elements fasten the cover on the pressure vessel,
   wherein the plurality of fastening elements are of a wedge-like construction,
   wherein the fastening element on one side abuts against an abutment surface of the pressure vessel and on an other side abuts against a contact surface of the cover in such a way that a displacement of the fastening element in a direction which causes a wider section of the wedge shape to be located between the abutment surface and the contact surface brings a plurality of locating faces closer together or clamps them to each other.

2. The pressure vessel as claimed in claim 1, wherein a surface normal of a first locating face is parallel to a plane normal of a plane which is spanned by a circumference of the cover.

3. The pressure vessel as claimed in claim 1,
   wherein the cover includes a radially outwardly open U-shaped profile contour which at least in a first plurality of sections extends in a circumferential direction and in which in an assembled state a preformed flange of the pressure vessel, which at least in a second plurality of sections extends radially inwards, is located, and
   wherein the first locating face is formed on an inner side face of the U-shaped profile contour and, lying opposite this, the second locating face is located on the preformed flange.

4. The pressure vessel as claimed in claim 3, wherein both the U-shaped profile contour with the first locating face and the preformed flange with the second locating face extend over the entire circumference of the cover.

5. The pressure vessel as claimed in claim 4,
   wherein the fastening element is located in the U-shape of the profile contour,
   wherein the contact surface of the cover is located on the preformed flange opposite the second locating face, and
   wherein the abutment surface is located on a flank of the U-shape which lies opposite the second locating face so that the fastening element is located between the contact surface and the abutment surface.

6. The pressure vessel as claimed in claim 3,
   wherein the fastening element is located in the U-shape of the profile contour,
   wherein the contact surface of the cover is located on the preformed flange opposite the second locating face, and
   wherein the abutment surface is located on a flank of the U-shape which lies opposite the second locating face so that the fastening element is located between the contact surface and the abutment surface.

7. The pressure vessel as claimed in claim 1, wherein the contact surface and the abutment surface together form a wedge gap with a first angle which corresponds to a second angle of the fastening element.

8. The pressure vessel as claimed in claim 7, wherein the fastening element includes a screw by means of which the fastening element may be pressed into the wedge gap and/or secured there.

9. The pressure vessel as claimed in claim 1,
   wherein the fastening element includes a form of a ring segment with a wedge-shaped cross-sectional profile, and
   wherein the wedge shape tapers radially inwards.

10. The pressure vessel as claimed in claim 1, wherein a plurality of fastening elements are disposed over the circumference along the cover seat.

11. The pressure vessel as claimed in claim 1, wherein the pressure vessel includes a parting joint which bisects the cover seat.

12. The pressure vessel as claimed in claim 1, wherein the plurality of fastening elements are located outside the pressure vessel.

13. The pressure vessel as claimed in claim 1, wherein the cover is centered in relation to the pressure vessel using a plurality of centering elements.

14. The pressure vessel as claimed in claim 1, wherein the cover is a first carrier of a bearing of a rotor which extends through the cover.

15. The pressure vessel as claimed in claim 1, wherein the cover is a second carrier of an inlet scroll for a compressor which is located in the pressure vessel.

16. The pressure vessel as claimed in claim 1, wherein the pressure vessel is the pressure vessel of a turbomachine including a cover which is formed as an inlet scroll.

* * * * *